July 21, 1925.
D. R. YARNALL
PRECIPITATOR
Filed Dec. 1, 1917
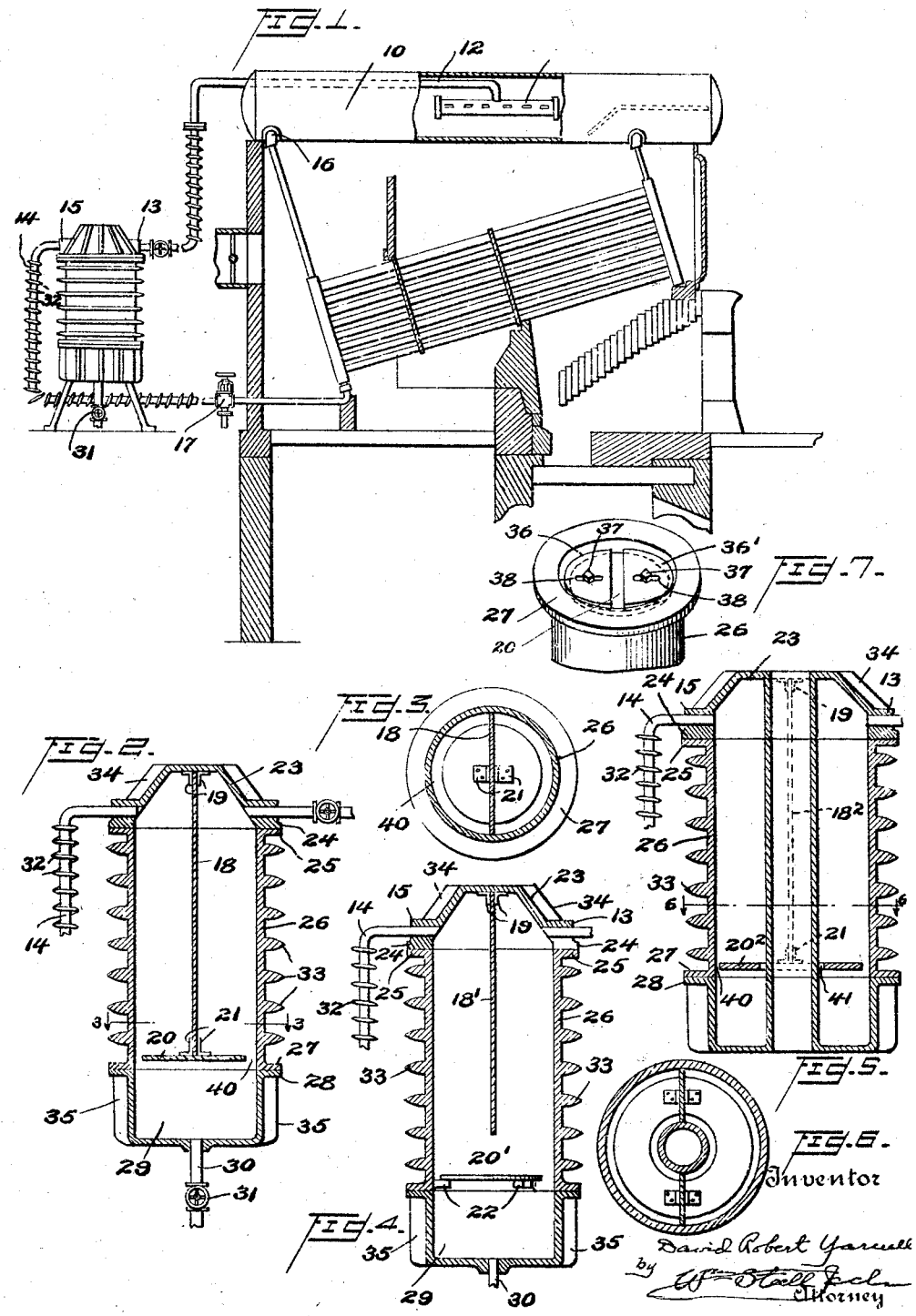

Patented July 21, 1925.

1,546,960

UNITED STATES PATENT OFFICE.

DAVID ROBERT YARNALL, OF PHILADELPHIA, PENNSYLVANIA, ASSIGNOR TO YARNALL-WARING COMPANY, OF PHILADELPHIA, PENNSYLVANIA, A CORPORATION OF PENNSYLVANIA.

PRECIPITATOR.

Application filed December 1, 1917. Serial No. 205,005.

*To all whom it may concern:*

Be it known that I, DAVID ROBERT YARNALL, a citizen of the United States, residing at 316 Preston St., Philadelphia, in the county of Philadelphia and State of Pennsylvania, have invented a certain new and useful Precipitator, of which the following is a specification.

My invention relates to precipitators for removing sediment and other similar matter such as carbonates and other scale forming ingredients from boiler water.

The purpose of my invention is to make the precipitator more efficient by increasing the temperature difference between the water in the body of the precipitator and the boiler water.

A further purpose is to cool the water in the precipitator and between it and the boiler in the intake and outlet pipes, or in any of these, increasing the precipitating action by the cooling of the water.

A further purpose is to control the speed of passage of water through the precipitator.

A further purpose is to supply flanges, ribs or projections upon the pipes and the body of the precipitator, or any of these, giving a radiating surface, for the purpose of reducing the temperature of the water.

The invention resides in the apparatus and in the method carried out thereby.

I have illustrated my invention by a few only of the forms in which it may appear to advantage, selecting therefor forms which are practical, efficient and relatively inexpensive and which at the same time well illustrate the principles of my invention.

Figure 1 is a side elevation, partly sectioned, showing one form of my invention.

Figures 2 and 3 are vertical sections taken upon lines 2—2 and 3—3 of Figure 1.

Figures 4 and 5 are sections similar to Figure 2, showing modified forms.

Figure 6 is a section on line 6—6 of Figure 5.

Figure 7 is a perspective view of one of the parts of the precipitator showing a modification.

Similar numerals illustrate corresponding parts.

I have discovered that the efficiency of the separation of suspended matter from boiler water by precipitation may be greatly increased by increasing the difference in temperature between the water in the separator and that in the boiler and by controlling the speed of circulation. With existing precipitators the temperature difference is too low. As the speed of circulation is dependent upon the temperature difference, the circulation has been slow even when the conditions of use otherwise would have permitted a higher speed.

By my invention I provide greater temperature differences at the same or even a much greater speed of flow, and enable the manufacturer or even the operator to vary the relation between the temperature drop and speed of flow to secure that most advantageous for the particular installation at hand.

In the illustration in Figure 1, I have shown my invention as applied to one form of water tube boiler without intending in any way to suggest that it is confined to use with water tube boilers or with any particular type thereof.

The form illustrated is a common type whose construction needs no description and in which the steam and hot water are collected in a drum 10 at the top.

Within any such drum or boiler, and preferably just below the surface of the water, I place a skimmer 11, which may be of any acceptable form. From the top of the skimmer I connect the inlet 12 with the precipitator, near the top and at one side as at 13. The outlet 14 leads from the top of the opposite side of the precipitator, as at 15, connecting with the drum at 16 and may be provided with a valve 17, if desired.

The shape of the precipitator is not of so much importance. It is most conveniently made as a cylinder. Whatever its section in vertical or horizontal planes, I provide for circulation longitudinally by a division plate 18, placed between the inlet and the outlet in order that the water may be given circulation through the precipitator from the inlet downwardly to or as nearly to the bottom of the precipitator as the design and speed of circulation make desirable, and then upwardly to the outlet on the opposite side.

The division plate may be secured in position by any suitable angles 19 and may carry at its lower end a transverse baffle plate 20. This may also be secured by angles such as 21. This plate nearly fills the entire cross section of the precipitator. Where the division plate connects with this transverse baffle, the water is required to pass between the sides or edges of this baffle plate and the inner sides of the precipitator, whatever the cross section of the precipitator.

By stopping the division plate 18′ before it reaches the transverse plate 20′ in Figure 4, I have intended to indicate that the connection between these two, cutting off any fluid flow across from the inlet to the outlet sides of the precipitator before the plate 20′ and the bottom of the precipitator are reached, does not affect my invention and good results may be attained either way. In this Figure 4, the transverse baffle plate 20′ is supported by any suitable lugs or spider connections, indicated generally at 22.

I have preferred to illustrate the precipitator as provided with a frusto-conical top 23, connected by any suitable flanges 24 and 25, with an intermediate or central barrel 26, which is in turn flanged at 27, to connect with flanges 28 of a bottom shell or cup 29, from which the outlet 30 provides for removal of the accumulated sediment or precipitate. This outlet 30 is shown as valved at 31. Here again the section of the particular part, i. e., whether the top be conical and whether the bottom be of cup shape as shown, is not a part of my invention and may be greatly varied.

The circulation is dependent in large measure upon the temperature differences. The total "head" producing the circulation can be that only due to the difference in density of the water on the two sides of the system and part of this may be neutralized by entrained steam. By my invention the effective head is greatly increased by providing much more temperature difference. The possible speed of circulation is correspondingly increased. I am thus able to meet the need of greater effective head and speed of circulation. At the same time, with a surplus of circulation medium, as it were, for such installations as do not require much head or for those engineers who favor extremely slow circulation, I can throttle the circulation available, to any extent desired.

I cool the precipitator system artificially. The best means which I know for this cooling is by increasing the heat radiating surface of one or more parts of the system. I have shown the inlet and outlet pipes provided with annular flanges or projections 32. The body of the precipitator is similarly ribbed annularly at 33 and the frusto-conical top and cup bottom are shown as longitudinally ribbed at 34 and 35.

It will be evident that a part of the benefit of my invention and sufficient for the purposes in some installations may be attained by increasing the radiating surface of or otherwise cooling one or more parts of the system and omitting it from the remainder, with a view to benefitting by the more complete and rapid removal of the sediment which I make possible without undue thermal loss.

In the manufacture in such a structure as illustrated in Figure 2, for example, I can restrict the passage between the plate 20 and the adjoining interior surface of the separator to any size that may be desired to throttle the circulation if the construction or the conditions of intended use require, and may even provide means for this adjustment in the device itself. One such means is shown in Figure 7, in which the user may remove the cup and move the semi-circular plates 36, 36′ away from each other to restrict the passage. The plates are held by screws 37 passing through slots 38 and secured to plate 20. The valve in the outlet pipe also provides a means to limit the extent of flow through the system.

The form shown in Figure 4 shows the division wall or plate terminating above the transverse plate, permitting circulation across above the plate and reducing the friction to the water flow within the precipitator.

In the form shown in Figures 5 and 6, I have provided additional means for cooling the precipitator by an interior air passage 39, in the form of a tube, by which air is permitted free inlet to the interior of the precipitator itself. In this form I have contemplated having the division $18^2$ extending all the way down to an annular plate $20^2$ and have provided not only for an outside passage for the water at 40, corresponding with the passage 40 in Figure 2, but have provided an interior passage 41 therefor. In other particulars this figure corresponds generally to the remaining figures.

It will be evident that there are many ways by which the precipitator system may be cooled to improve the circulation, and by which a proper balance may be secured, allowing sufficient dwell of the water for the settling of the suspended matter while changing the water at a practicable speed.

Having thus described my invention, what I claim as new and desire to secure by Letters Patent is:

1. A precipitator, a boiler, connections therebetween, heat dissipating means for increasing the circulation between the precipitator and the boiler above the required rate and means within the precipitator for adjustably throttling the circulation to secure the speed desired.

2. A precipitator, a boiler, connections therebetween, artificial means for stimulating the circulation between the precipitator and boiler by reducing the temperature of one part, a longitudinal division wall in the precipitator providing circulation thereabout and means at the lower end of said wall for throttling the circulation to secure the speed desired.

3. A precipitator, a boiler, connections therebetween, artificial means for stimulating the circulation between the precipitator and the boiler by heat radiation, a longitudinal partition in said precipitator providing circulation thereabout and a flat transverse throttling plate at the lower end of the precipitator to reduce the circulation to the speed desired.

4. A precipitator, a boiler, connections therebetween, and precipitator means one external for stimulating and the other internal for reducing the speed of circulation securing between them for the desired rate.

DAVID ROBERT YARNALL.